United States Patent Office 3,008,805
Patented Nov. 14, 1961

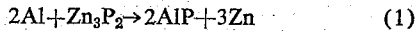

3,008,805
PREPARATION OF METAL PHOSPHIDES
Arrigo Addamiano, Willoughby, Ohio, assignor to General Electric Company, a corporation of New York
No Drawing. Filed June 9, 1959, Ser. No. 819,002
5 Claims. (Cl. 23—204)

This invention concerns a process of preparing the phosphides of aluminum, gallium, and indium, namely AlP, GaP, and InP, substances which are useful, for example, as semiconductors.

The instant application is a continuation-in-part of my earlier application Serial No. 762,715, filed September 23, 1958, entitled "Preparation of Aluminum Phosphide," now abandoned.

To the best of my knowledge, these metal phosphides are not commercially available or can be obtained only in very small amounts suitable only for research purposes. A practical method for large scale preparation of AlP, GaP, and InP has not heretofore been available. The materials have up to now usually been prepared by direct synthesis from the elements: for example by burning aluminum in the vapor of phosphorus, by igniting a mixture of aluminum and yellow phosphorus, by heating a mixture of aluminum and phosphorus in an atmosphere of air or hydrogen in a sealed tube at red heat; by taking to a high temperature a mixture of gallium and phosphorus with gallium in excess and removing the excess gallium at the end of the reaction; or by heating in a sealed tube indium and phosphorus, taking care not to generate a high phosphorus pressure in the sealed tube.

Because of the hazards involved in working with a flammable material like phosphorus, and also because of its high vapor pressure at moderately high temperatures, the foregoing methods are delicate and do not lend themselves to the production of large amounts of the phosphides of aluminum, gallium, and indium.

Other methods of preparation, such as the reduction of metal phosphates with hydrogen, lead to the formation of the metal oxides and phosphorus. Specifically, I have studied the reduction of aluminum phosphate, $AlPO_4$, by a stream of hydrogen at temperatures in the range of 400 to 1100° C., always obtaining alumina, $Al_2O_3$, and phosphorus. Likewise, reduction of aluminum phosphate with carbon in an atmosphere of argon does not occur at 800° C. even with a reaction time of five hours, while at 1100° C., a complicated transformation takes place with evolution of phosphorus and formation of much $Al_2O_3$, just a small amount of AlP, and a mixture of other products which could not be identified by X-ray analysis.

It is therefore an object of the present invention to provide a method of preparing the phosphides of aluminum, gallium and indium, which readily yields pure products, and which is inexpensive and relatively free of hazards.

In accordance with the present invention, I have found that the above objective are realized in the reactions of the metals Al, Ga, and In, with a commercially available phosphide, zinc phosphide, $Zn_3P_2$, at temperatures in the range of 700 to 1000° C. The zinc phosphide should be present at least in stoichiometric proportions; an excess over stoichiometric proportions is preferable for the preparation of gallium and indium phosphides.

The optimum reaction temperature may be selected under the following considerations:

The boiling points of aluminum, gallium, and indium are high, around 2000° C., therefore these metals have very low vapor pressures even at high temperatures. On the other hand they melt at very low temperatures; for instance, gallium is liquid below 30° C., indium melts at 157° C., and aluminum melts at 660° C.

The other reactant, zinc-phosphide, $Zn_3P_2$, is stable in a neutral atmosphere up to about 1050° C., above which it sublimes without decomposition. In contrast zinc melts at a low temperature (419° C.) and boils at a low temperature as well (917° C.).

If one considers the scheme of reaction in which a metal, such as aluminum, reacts with zinc-phosphide, to form the metal-phosphide and zinc, for instance, $$2Al + Zn_3P_2 \rightarrow 2AlP + 3Zn \qquad (1)$$

there is seen to be an advantage in working close to the boiling point of zinc in order to eliminate it from the products formed in the reaction. However, the temperature cannot be raised excessively in order to avoid losses by evaporation of $Zn_3P_2$, also a relatively volatile substance. The practical limits for the temperature of reaction are also influenced by the thermal stability of the metal phosphides formed. Thus the melting point of AlP is believed to be higher than 1500° C., the melting point of GaP is about 1350° C., while InP decomposes at atmospheric pressure, when it is taken to its melting point of 1060° C. Therefore a higher reaction temperature can be used for the formation of aluminum phosphide than for the formation of indium phosphide, by the present method. This is, however, not necessary, because of the higher reactivity of aluminum. In practice it has been found that a temperature in the interval 700–900° C., for instance and preferably about 800° C., is satisfactory for the formation of the phosphides of aluminum, gallium and indium, with good reaction yields, by allowing reaction times of from 2–3 hours and up to approximately 24 hours, depending on the quantities of reagents.

With reference to reaction Equation 1, which holds also, with appropriate changes, for the formation of the phosphides of gallium and indium, the reaction must occur in a neutral atmosphere, such as a hydrogen or argon atmosphere. Operating in an open vessel, in a neutral gas stream helps with the removal of the volatile zinc vapors. A temperature gradient is also useful for this purpose. The zinc formed in the process can eventually be retransformed, in a suitable collection chamber, into zinc-phosphide, which can be recycled again, thus allowing a continuous production process.

With reference to reaction Equation 1, the reaction is favored by introducing an excess of zinc-phosphide over stoichiometric proportions into the reaction mixture, so as to shift the reaction balance to the right in the equation.

It will be apparent to those skilled in the art, that the availability of very pure aluminum, gallium and indium metals, and the ease with which the commercially available zinc-phosphide can be purified by sublimation, make the instant process practical and highly advantageous for the preparation of the phospides of the elements of the third group of the periodic system in question.

The following examples illustrate the practice of the invention.

*Example I.*—A fine powder consisting of stoichiometric amounts of aluminum and zinc-phosphide (purified by sublimation) is mixed thoroughly and transferred to a fused silica boat. The boat with the charge is set in the center of a furnace and the air is displaced by a steady stream of argon. Keeping the argon stream on all the time, the temperature is raised to 800° C. and kept at this value for 3–6 hours. At a temperature of about 700° C., zinc vapors begin to evolve, and the evolution of vapors becomes much faster as the temperature increases. When the evolution of the vapors is over, the temperature is raised to 1100° C. to eliminate excess unreacted zinc-phosphide. After one hour or so the furnace is shut off and allowed to cool to room temperature.

The product so obtained is a cake of pure aluminum phosphide, which can be easily pulverized and reduced to a fine powder of light pea-green color. The reaction yield is at least 93% when no stirring or agitation of the reaction mixture is introduced. The analytical values are in agreement with the theoretical formula and X-ray powder patterns of the product obtained show only the lines of a cubic substance with zinc-blende structure and cell edge $a = 5.45$ A., which is the known pattern of AlP.

*Example 2.*—A mixture of pure gallium metal, or gallium zinc-eutectic (melting point 25° C.) and zinc-phosphide, prepared by prolonged mixing of the compounds above 30° C. and containing excess zinc-phosphide powder over the stoichiometric requirements, is put in a boat of spectroscopically pure graphite and introduced into the furnace, in an argon atmosphere, as in Example 1. The temperature is raised to 800° and the reaction continued for 24 hours with occasional gentle shaking of the boat. The temperature is then lowered to room temperature and the boat removed. The excess unreacted zinc-phosphide is removed with a weak acid such as dilute hydrochloric acid and the substance washed many times with deionized or distilled water, until any trace of acid has been removed. Some gallium metal which agglomerates to form spherical particles is eliminated, mostly mechanically by centrifugation or sedimentation. The gallium phosphide powder obtained is of a yellow or greenish-yellow color and gives the powder pattern of a cubic substance with zinc-blende structure and the cell edge, $a_0 = 5.450$ A. The reaction yield is lower than the theoretical value, due to the tendency of the gallium metal to agglomerate into spherical particles before the reaction occurs. However, the X-ray patterns of the end products do not show lines of impurities. High yield of the process is favored by continuous stirring and agitation of the mixture during reaction and by the use of large amounts of gallium in the preparation.

*Example 3.*—Indium phosphide is prepared, similarly to gallium phosphide, by reacting an intimate mixture of fine indium powder, and fine zinc-phosphide powder (after purification by sublimation and in excess of stoichiometric proportions) in an argon stream at 800° C. The reaction product, after 24 hours, consists of a black powder of InP, unreacted In globules contaminated on the surface by InP and $Zn_3P_2$ and excess $Zn_3P_2$. The excess zinc-phosphide is eliminated by acid treating as for GaP. After washing with water to eliminate any trace of acid and drying, the indium globules are eliminated mechanically. The indium phosphide obtained gives the expected pattern for a substance with zinc-blende structure and cell edge $a_0 = 5.87$ A. No indium lines or lines due to other impurities, are present in the patterns so obtained, an evidence of the high-purity of the product.

The foregoing description of the process and discussion of the parameters of technical interest illustrated in the examples above will readily suggest modifications within the spirit of the invention. The scope of the invention is therefore to be determined by the appended claims.

What I claim as new and desire to secure by Letters Patent of the United States is:

1. The method of preparing a phosphide of a metal from the group consisting of aluminum, gallium, and indium, which comprises firing in a neutral atmosphere and at a temperature in the range of 700 to 1000° C. a mixture of zinc phosphide and metal from said group, and continuing the firing for a time sufficient to yield the metal phosphide.

2. The method of preparing a phosphite of a metal from the group consisting of aluminum, gallium, and indium, which comprises firing in a neutral atmosphere and at a temperature in the range of 700 to 900° C. a mixture of zinc phosphide and metal from said group where the zinc phosphide is present at least in stoichiometric proportions, and continuing the firing for a time sufficient to yield the metal phosphide with evolution of zinc.

3. The method of preparing aluminum phosphide which comprises firing in a neutral atmosphere and at a temperature in the range of 700 to 900° C. a mixture of zinc phosphide and aluminum in stoichiometric proportions, and continuing the firing for a time sufficient to yield aluminum phosphide with evolution of zinc.

4. The method of preparing gallium phosphide which comprises firing in an inert atmosphere and at a temperature in the range of 700 to 900° C. a mixture of zinc phosphide and gallium where the zinc phosphide is present in excess of stoichiometric proportions, continuing the firing for a time sufficient to yield gallium phosphide with evolution of zinc, and then removing the excess unreacted zinc phosphide with acid.

5. The method of preparing indium phosphide which comprises firing in an inert atmosphere and at a temperature in the range of 700 to 900° C. a mixture of zinc phosphide and indium where the indium is present in excess of stoichiometric proportions, continuing the firing for a time sufficient to yield indium phosphide, and then removing the excess unreacted zinc phosphide with acid.

References Cited in the file of this patent

Mellor: "Comprehensive Treatise on Inorganic and Theoretical Chemistry," 1928, vol. VIII, pp. 833, 834, 842, 843, 846.

Von Wazer: "Phosphorus and Its Compounds," vol. 1, pp. 128, 129, 147, 148.

"Handbook of Chemistry and Physics," 38th ed., 1956, p. 2104.